| 2,938,799
| Patented May 31, 1960

2,938,799
DRY PUDDING COMPOSITION

Harry A. Toulmin, Jr., Dayton, Ohio, assignor to The Commonwealth Engineering Company of Ohio, Dayton, Ohio No Drawing. Filed Sept. 3, 1958, Ser. No. 758,676

6 Claims. (Cl. 99—139)

This invention relates to a pudding composition and more particularly to such a composition in the form of a dry powder which, on the addition of a liquid thereto, and with or without heating, becomes a firm, palatable pudding having a smooth texture.

The available pudding compositions for the most part comprise pudding starch derived from various sources, that is, starch which is known to give the pudding effect, plus selected flavoring adjuvants. Invariably, those compositions tend to agglomerate into difficulty dispersible lumps, especially if used in fine powdered condition, when the reconstituting liquid is added, and are characterized by a starchy taste which reduces their palatability substantially. As is known, it is sometimes attempted to mask this objectionable starchy taste by using the flavoring ingredients in excessive amounts.

It is an object of this invention to provide a composition which, on addition of the appropriate edible liquid such as milk or water forms a smooth, palatable pudding which is essentially free from the, or has less of the starchy taste of conventional puddings of this type.

Another object is to provide a composition which, on addition of the liquid, forms a pudding having the firm body of a starch pudding, in contrast to the soft rennet custards for example, but which does not taste like starch and which has, therefore, superior eating qualities.

These and other objects are accomplished by the present invention which provides dry pudding compositions comprising dextran or an edible dextran derivative.

The compositions may, and preferably do, comprise the dextran or dextran derivative as the sole base or bodying ingredient, or it may comprise a mixture of the dextran or dextran derivative with starch which may be a regular pudding starch or a starch pregelatinized in any suitable manner.

The dextrans are high molecular weight polysaccharides comprising anhydroglucopyranosidic units joined by molecular structural repeating alpha-1,6 and non-alpha-1,6 linkages, at least 50% of these linkages being, apparent, of the alpha-1,6 type. The properties of the dextrans, including the molecular weight, molecular structural repeating alpha-1,6 to non-alpha-1,6 linkages ratios, and the water sensitivity may vary widely.

The dextrans which may be used as the base for the present dry pudding mixes, alone or in admixture with starch, may have a molecular weight in the range 5000 to $150 \times 10^6$, as determined by light scattering measurements, a molecular structural repeating alpha-1,6 to non-alpha-1,6 linkages ratio of from about 1:1 to 30:1, and a water solubility or dispersibility such that they form stable aqueous solutions or dispersions of from 0.5% to 50% concentration. The preferred dextrans for use as the sole base or bodying ingredient of the pudding are those having an average molecular weight of at least 50,000.

These dextrans may be obtained by various methods. They may be synthesized from sucrose by enzyme action in the presence or substantial absence of bacteria. For example, an aqueous nutrient medium containing sucrose, particular nitrogenous compounds and certain inorganic salts, may be inoculated with a culture of an appropriate microorganism such as those of the Leuconostoc mesenteroides and L. dextranicum types, and incubated at the temperature most favorable to the growth of the microorganism until maximum dextran production is attained. This is synthesis of the dextran from sucrose by the so-called "whole culture" method, i.e., the synthesis is effected by enzyme action in the presence of the bacteria and cellular debris. Or the culture obtained by cultivating the Leuconostoc bacterium may be filtered to isolate the enzyme (dextransucrase) which occurs in the filtrate, the filtrate, usually after dilution to predetermined enzyme potency, may be mixed with an aqueous sucrose solution, and the mixture may be allowed to stand under controlled conditions of pH and temperature until the dextran is synthesized. The enzyme may be separated from the filtrate and used in powdered condition or in the form of an aqueous solution, usually the latter. This is dextran synthesis by enzyme action in the substantial absence of bacteria and cellular debris.

The dextran obtained initially by these procedures normally has a very high average molecular weight, calculated to be in the millions. It may be precipitated from the medium in which it is synthesized by the addition of an organic liquid which is a non-solvent for the dextran. The non-solvent, or precipitant, may be a water-miscible aliphatic alcohol, e.g., methanol, ethanol or isopropanol, or a ketone such as acetone or dioxane. The precipitated dextran may be purified and dried to a substantially white mass which may be reduced to powdered condition for use as the pudding mix base or bodying ingredient. In many instances, these "native" dextrans are preferred for the present use.

Instead of using the dextran in its native or high molecular weight state, however, it may be hydrolyzed by acid or enzyme action to a molecular weight in the medium to lower area of the range stated herein. So-called "clinical" dextran having an average molecular weight of from 20,000 to 200,000 may be used and is very acceptable. In "clinical" dextran production, when the desired molecular weight is obtained by hydrolysis or cleavage of the native material, it is usual to isolate the "clinical" product from the hydrolyzate by fractional precipitation according to which, by successive addition of increasing amounts of water-miscible alcohol or ketone, the highest molecular weight fraction is first thrown down and separated, and the desired or intermediate molecular fraction is then precipitated and recovered. This procedure leaves a supernatant containing dextran the average molecular weight of which is below the "clinical" range, and the supernatant is usually discarded as waste.

According to this invention, the low molecular weight (generally about 5000 to 50,000) residual dextran may be recovered from the supernatant for use as the base of the pudding mix. These low molecular weight dextrans are usually most useful as a pudding base when used in combination with starch. The different dextran fractions may also be isolated from the hydrolyzate by fractional solution methods involving the use of the precipitant in conjunction with a dextran solvent, usually water. It may be noted, here, that when the dextran synthesis is effected by the action of the enzyme on sucrose in the absence of bacteria, it is possible to carry out the synthesis under conditions such as to favor the production of dextran of relatively low molecular weight in at least preponderant proportion. It is possible, therefore, as is now known, to obtain "clinical" dextran directly and the dextran used in the present pudding mixes may be so obtained.

The present pudding compositions the base or bodying ingredient of which may be the dextran or a mixture thereof with starch, may be prepared by simply intimately mixing the finely divided dextran with sugar, and flavoring and other adjuvants selected for special purposes, and optionally with finely divided starch, in any suitable mixing device.

The pregelatinized starch which may be used with the dextran may be obtained by subjecting raw starch to various treatments. For instance, the starch may be acted on by various chemical gelatinizing agents of the type of calcium chloride, relatively strong alkalies, or thiocyanates. Also, the pregelatinized starch may be obtained by mixing a known pudding starch derived, for example, from maize, rice, arrowroot, tapioca or other known source, with water, adding sugar, heating and drying the mixture, and grinding it to fine grain or particle size. In a modification, the pudding starch may be mixed with water and a chemical gelatinizing agent such as alkaline compounds, i.e., alkali metal and alkaline earth metal chlorides or hydroxides such as sodium hydroxide, sodium carbonate, sodium bicarbonate, calcium hydroxide, various metal thiocyanates preferably alkaline thiocyanates which normally increase the rehydration and gelation characteristics of starch, and the mixture may then be dried by heat.

Using the finely divided pudding starch or pregelatinized starch, it is mixed with the finely divided dextran and sufficient sugar, and flavoring agent to taste to provide a mix which may be reconstituted with water to give a palatable pudding which has the consistency and firm body of a starch pudding but which does not have, or has less of, a starchy taste than conventional starch puddings especially when, as is preferred, the pudding starch or pregelatinized starch is used in such an amount that it does not comprise more than 50% by weight of the total base material comprising it and the dextran. If a pregelatinized starch prepared with water and sugar, with or without the addition of a chemical gelatinizing agent, is used, sugar may be omitted during commingling of the dextran, starch and flavoring agent, or reduced amounts of sugar may be incorporated at that stage.

When it is desired to reconstitute the composition with milk there may be included with it a casein coagulating agent, which may be a solid, crystalline organic acid which is nutritionally non-tonix and safe, such as tartaric or citric acid, or a proteolytic enzyme which may be any of the known protein, splitting enzymes including trypsin, pepsin, and rennin. The compositions comprising acid are generally particularly adapted to producing a fruit flavored pudding, whereas a proteolytic enzyme may be preferred as the casein coagulant when other flavors such as chocolate, butterscotch, vanilla or the like are desired. If an acid is used, the acidity may be neutralized by the inclusion of a neutralizing agent in the same package with the mix or as a separate item, and preferably the former, the neutralizing agent acting to prevent any extensive, undesired hydrolysis of the dextran ingredient, and of the starch, if starch is present. Suitable neutralizing agents are calcium carbonate, calcium hydroxide, sodium carbonate, sodium bicarbonate, the corresponding potassium salts and any other alkaline salts which are stable when dry, soluble to the required extent, and physiologically innocuous.

Microorganisms which may be cultivated to obtain a culture which may be added to the sucrase-bearing medium as whole culture or which may be filtered to isolate the enzyme dextransucrase to be mixed with the sucrose bearing medium include the strains carrying the following NRRL (Northern Regional Research Laboratories) designations: *Leuconostoc mesenteroides* B–512, B–119, B–1146, B–1190, B–742, B–1191, B–1196, B–1208, B–1216, B–1120, B–1144, and B–523; *Streptobacterium dextranicum* B–1254 and *Betabacterium vermiforme* B–1139.

Instead of the dextrans themselves, physiologically harmless dextran derivatives may be used and among these the carboxyalkyl and hydroxyalkyl ethers in which the alkyl group contains from 1 to 5 carbon atoms are of special importance for use as base or bodying ingredient of the pudding mixes, carboxymethyl and hydroxyethyl dextrans being presently preferred. These ethers may have a D.S. (average degree of substitution or ratio of carboxyalkyl or hydroxyalkyl groups per anhydroglucopyranosidic unit of the dextran) of from less than 1.0 to about 3.0.

The following examples are illustrative of specific pudding compositions according to the invention. The quantities listed for the different ingredients may be varied, of course, and certain of the ingredients may be omitted or substituted by equivalents.

*Example I*

| Ingredients: | Quantities (gms.) |
|---|---|
| Dry particulate dextran (native B–512) | 30.0 |
| Tartaric acid | 3.0 |
| Calcium hydroxide | 0.56 |
| Granulated sugar | 80.0 |
| Salt | 1.0 |

*Example II*

| Ingredients: | Quantities (gms.) |
|---|---|
| Dry particulate dextran (native B–512) | 15.0 |
| Dry particulate pregelatinized starch | 15.0 |
| Granulated sugar | 80.0 |
| Salt | 1.0 |
| Pepsin | 0.25 |

*Example III*

| Ingredients: | Quantities (gms.) |
|---|---|
| Dry particulate dextran (average M.W. 20,000 to 200,000) | 37.0 |
| Cane sugar | 37.0 |
| Cocoa | 15.0 |
| Salt | 1.0 |
| Vanilla | 0.5 |
| Dry pregelatinized starch | 10.0 |

Each of these compositions were reconstituted by adding one pint of milk thereto, and heating at moderate temperatures (40–80° C.).

*Example IV*

| Ingredients: | Quantities (gms.) |
|---|---|
| Dextran (native B–512) | 30.0 |
| Tartaric acid | 3.0 |
| Calcium hydroxide | 0.56 |
| Granulated sugar | 80.0 |
| Salt | 1.0 |

*Example V*

| Ingredients: | Quantities (gms.) |
|---|---|
| Dextran (M.W. 30,000) | 30.0 |
| Calcium hydroxide | 0.56 |
| Granulated sugar | 80.0 |
| Salt | 1.0 |

*Example VI*

| Ingredients: | Percent by weight |
|---|---|
| Sugar | 71.0 |
| Water | 13.0 |
| Shortening (vegetable fat) | 12.0 |
| Salt | 0.2 |
| Flavoring (vanilla extract) | 0.4 |
| Hydroxyethyl dextran (D.S. 1.5) from native B–512 dextran | 3.4 |

The compositions of Examples IV and VI were reconstituted by the addition of one pint of water while heating at 40–80° C. They could also be reconstituted by the addition of a pint of milk.

The reconstituted puddings, and especially those containing "clinical" dextran or dextran of higher molecular weight were smooth, palatable, eminently acceptable products. The taste of these puddings was superior to that of a starch containing pudding obtained by adding a pint of milk to a mixture of 30.0 gms. cornstarch, 80.0 gms. of granulated sugar, 1.0 gms. of salt and 0.25 gm. of pepsin. The higher molecular weight dextran (clinical or above) swelled readily in both milk and water to give a smooth, homogeneous dispersion. Therefore, it is unnecessary to resort to pregelatinization treatments such as generally required for starch, in order to produce a highly acceptable pudding.

The compositions of Formulae I and II may be reconstituted by the addition of one pint of milk with stirring and moderate heating. The composition of Formula III may be reconstituted by adding milk or water thereto. Water may be used to reconstitute the compositions of Formulae I and II but in that event the casein coagulant may be omitted.

The dextrans being non-toxic, bland, tasteless and odorless polysaccharides which can be eaten safely, are well adapted to the present use. Used without starch, they do not influence the flavor of the pudding. While they do not mask the taste of starch, when used therewith, they minimize the starchy taste by permitting the use of smaller amounts of starch without loss of the firm-bodies, smooth pudding texture. As has been noted, it is in general, preferred to omit starch from the compositions.

The relative proportions of the ingredients may be varied rather widely. The dextran may comprise 100% of the bodying agent or, if starch is also present, the dextran or physiologically harmless dextran derivative may comprise up to 50% of the total bodying ingredient. It may be preferred, however, to employ an even lower proportion of starch such as from 0.5 to 15% of the total bodying component consisting of dextran or dextran derivative and starch.

Biological tests have shown that dextran, particularly those of higher alpha-1,6 or non-alpha-1,6 linkages ratios, exhibit the interesting and important effect of preventing or controlling gains in body weight when taken with a normal diet. It appears that this result is due to the fact that the 1,6 linkages of dextran are resistant to attack by bacteria and enzymes present in the gastro-intestinal tract. Since the dextrans tend to form a film over particles of food nutrients, which film must be destroyed before the nutrient particles are available for absorption and assimilation, the rate at which the absorption and assimilation take place is retarded, affording a greater balance between the rate at which energy is created by absorption and assimilation of food, and the rate of energy expenditure so that less energy is available in a given time period for storage as fat. Whatever the exact explanation, the dextrans, and especially those having alpha-1,6 to non-alpha-1,6 linkages ratios of 10:1 to 30:1 are effective weight controlling aids. These include the dextrans obtained using the following microorganisms or their enzymes: Leuconostoc mesenteroides B-512 (18:1 or 19:1), L. mesenteroides B-1190 (16:1), L. mesenteroides B-1146 (22:1). The dextran puddings can therefore be expected to effect a lesser increase in body weight than usually results, at least in some individuals, for consumption of sweet puddings.

Carboxymethyl dextran or hydroxyethyl dextran or edible salts thereof such as the sodium salt derived from dextrans having high, medium or low average molecular weights in the range 5000 to $150 \times 10^6$, preferably 50,000 to $150 \times 10^6$, may be preferred as the bodying agents or for use in admixture, as in equal parts, with dextran or a mix comprising dextran and a small amount (0.5 to 15%) of a pregelatinized starch. The carboxymethyl and hydroxyethyl ethers, and their sodium salts, are soluble in water. Water-soluble dextrans are also generally preferred.

Various changes and modifications may be made in the details described herein. For instance, the pudding mix may comprise dry powdered milk or casein; likewise, dry powdered milk and casein coagulating agent may be added to the base and sweetening and flavoring adjuvants, to obtain compositions reconstitutable by water to a "milk" pudding. This and other modifications may be made in practicing the invention without departing from the spirit and scope thereof and it is to be understood that it is not intended to limit the invention except as it is defined in the appended claims.

What is claimed is:

1. A dry composition to be mixed with milk and water for producing a smooth, palatable pudding comprising, as sole base or bodying component, particulate hydroxyethyl dextran, and the dextran being of the strain Leuconostoc mesenteroides NRRL B–512.

2. A composition to be mixed with milk and water for producing a smooth, palatable pudding and comprising a dry mixture of a particulate, substantially pure hydroxyalkyl ether of the dextrans in which the alkyl portion of the hydroxyalkyl groups contains 1 to 5 carbon atoms and physiologically harmless as sole base or bodying component, and a taste-modifying adjuvant, and the dextran being of the strain Leuconostoc mesenteroides NRRL B–512.

3. A composition to be mixed with milk and water for producing a smooth, palatable pudding comprising a dry mixture of a particulate, water-soluble substantially pure hydroxyalkyl dextran and derived from dextran having an average molecular weight of from 50,000 to $150 \times 10^6$, as determined by light scattering measurements, as sole base or bodying component, a taste-modifying adjuvant, a physiologically harmless acid as casein coagulant, and a neutralizing agent for the acid, and the dextran being of the strain Leuconostoc mesenteroides NRRL B–512.

4. A composition to be mixed with milk and water for producing a smooth, palatable pudding having less of a starch taste than puddings containing starch as sole base or bodying component and comprising a dry mixture of particulate hydroxymethyl dextran, a taste-modifying adjuvant, and a particulate starch which gives the pudding effect, the starch being present in an amount between 0.5% and 50% by weight, based on the combined weight of the hydroxymethyl dextran and starch, and the dextran being of the strain Leuconostoc mesenteroides NRRL B–512.

5. A composition to be mixed with milk and water for producing a smooth, palatable pudding having less of a starch taste than puddings containing starch as sole base or bodying component and comprising a dry mixture of particulate hydroxyethyl dextran, a taste-modifying adjuvant, and a particulate starch which gives the pudding effect, the starch being present in an amount between 0.5% and 50% by weight, based on the combined weight of the hydroxyethyl dextran and starch, and the dextran being of the strain Leuconostoc mesenteroides NRRL B–512.

6. A pudding composition comprising the following constituents by weight

| | Percent by weight |
|---|---|
| Sugar | 71.0 |
| Water | 13.0 |
| Shortening | 12.0 |
| Salt | 0.2 |
| Flavoring | 0.4 |
| Hydroxyethyl detran from native dextran and the dextran being of the strain Leuconostoc mesenteroides NRRL B–512 | 3.4 |

References Cited in the file of this patent

UNITED STATES PATENTS

| 2,089,217 | Mahoney | Aug. 10, 1937 |
| 2,409,816 | Wadsworth et al. | Oct. 22, 1946 |
| 2,500,179 | Hinz et al. | Mar. 14, 1950 |
| 2,602,082 | Owen | July 1, 1952 |
| 2,609,368 | Gaver et al. | Sept. 2, 1952 |
| 2,818,343 | Toulmin | Dec. 31, 1957 |